Dec. 21, 1965   A. F. HOLDEN   3,224,431
OPEN WATER HEATING SYSTEM
Filed July 16, 1963   2 Sheets-Sheet 1

INVENTOR.
ARTEMAS F. HOLDEN
BY Farley, Forster
and Farley
ATTORNEYS

United States Patent Office 3,224,431
Patented Dec. 21, 1965

3,224,431
OPEN WATER HEATING SYSTEM
Artemas F. Holden, 2195 S. Milford Road, Milford, Mich.
Filed July 16, 1963, Ser. No. 295,430
6 Claims. (Cl. 126—355)

This invention relates to a hot water heating system and more particularly to an open water heating system where the final stage of heat transfer is accomplished through direct radiant heating of water passing a radiant heating element.

In a preferred embodiment such heating element comprises a vertical gas-fired luminous wall heating panel element past which free water falls in film or sheet form into an open water tank at the bottom of the furnace. A series of substantially horizontal pans at the top of the furnace conduct the flow of incoming water over a relatively large heat exchange area, progressively descending to the final free-fall stage directly in front of the radiant heating panel. The rising combustion gases progressively give up additional heat to the pans, pre-heating the water flowing thereover and augmenting the efficiency of the furnace. A final air tube condenser stage above the uppermost water pan is desirable to condense any water vapor rising with the combustion gases and to further reduce the temperature of the exhaust gases, optimizing the efficiency of the furnace. Heated water from the open tank at the bottom of the furnace is circulated through suitable radiators and cold water is reutrned to the uppermost pan at the top of the furnace.

This open water heating system avoids any possible danger of explosive pressures incident to conventional boiler and other closed hot water systems. In addition, it avoids the development of scale and deposits in boiler or hot water tubes which operate to curtail water flow, heat transfer and ultimately impair the efficiency of furnace operation. In addition, experience has established that the direct contact of combustion gases with the water of the heating system produces a water softening effect by chemically reacting to precipitate or render the dissolved impurities of the water more readily precipitated by soap or other cleaning agents.

Figure 1:
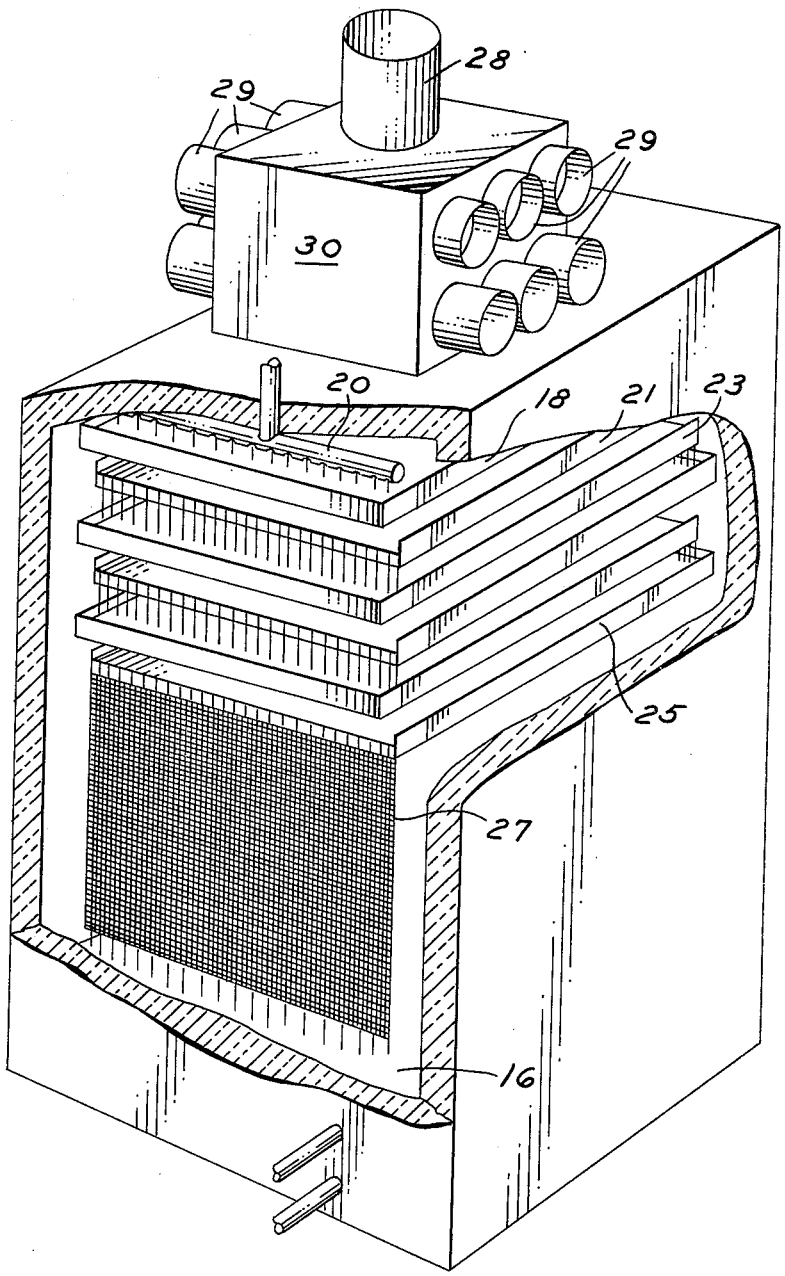
Figure 2:
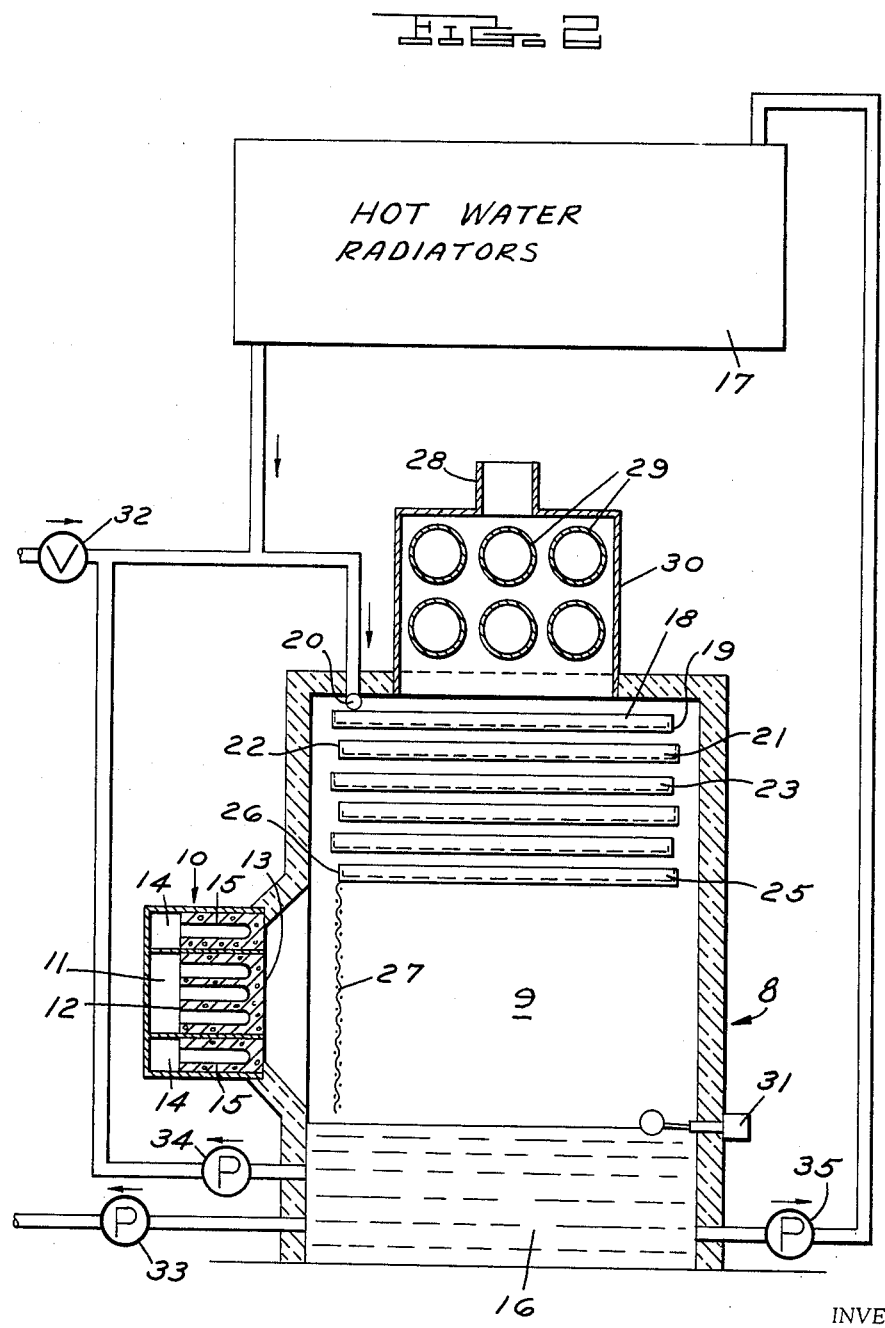

These and other objects of the invention will be more apparent from the following detailed description of a specific preferred embodiment of the heating system with reference to drawings illustrating the same wherein:

FIGURE 1 is a schematic perspective view of the furnace per se, having the firing and other fragmentary portions of the walls broken away to reveal the interior construction; and FIGURE 2 is a schematic vertical sectional view of the furnace shown in FIGURE 1 as installed in a typical heating system.

Referring to the drawings, the furnace 8 with enclosed heating chamber 9 includes a luminous wall gas firing unit 10 constructed in accordance with my prior United States Patents 3,076,605 and 3,008,513 and a plenum chamber 11 for conducting a combustible gas-air mixture through a porous firewall 12 to a luminous highly radiant firing face 13, as well as air passages 14 for conducting cooling air through firebrick 15 around the perimeter of the firing face. Hot water 16 from an open tank at the bottom of the furnace is pumped through radiators, or any other suitable heat exchangers depending upon the requirements of the heating system, schematically indicated at 17 and the cold water is returned to the uppermost pan 18 at the top of the furnace which has one of its sides 19 remote from the water inlet 20 adapted to provide overflow into the next lower pan 21, having its opposite side 22 adapted to overflow into the next lower pan 23, thereby providing progressive transverse back and forth water flow to the lowermost pan 25, which, in turn, has one side 26 adapted to overflow in front of the firing face 13. A screen 27 of suitable high temperature resistant material may be suspended from the sidewall 26 to provide for film distribution of the overflowing sheet of water as well as a separation of the water particles to provide a greater area exposure to the radiant heating source.

The burned gases, with such heat as is not transferred to the water film at the final stage of heating through radiation air convection and conduction from the screen 27, pass upwardly, progressively transferring residual heat to the successive water pans which, in turn, is conducted to the transversely flowing water, pre-heating the same and thereby reducing the temperature of the stack gases exhausted at the flue 28. In order to further cool exhaust gases, condense any water vapor which has arisen therewith, and provide optimum furnace efficiencies, a series of air tubes 29 may be installed in a compartment 30 at the top of the furnace above the water pans.

The furnace may be installed in a combined building heating and hot water supply system as illustrated in FIG. 2, showing a water level device 31 for controlling inlet valve 32 for admitting make-up water to replace that circulated by pump 33 to meet hot water demands. A pump 34 may be provided to recirculate water independently of the heating demand supplied by pump 35 in order to maintain the temperature of the water 16 at the bottom of the furnace at a predetermined value.

While a specific preferred embodiment of my invention incorporated in a particular combination heating system has been illustrated and described above in detail, it will be understood that numerous modifications might be resorted to without departing from the scope of the invention as defined in the following claims.

I claim:

1. A water heating system comprising a furnace having an enclosed heating chamber, a plurality of substantially horizontal vertically spaced water pans at the top of said chamber, a water inlet leading to the uppermost of said pans, opposite ends of successive pans being adapted to discharge to the next lower pan, the lowermost of said pans having a discharge edge providing an overflow water curtain adjacent one side of said heating chamber, a vertically extending gas-fueled luminous wall radiant heating panel closely adjacent the path of said water curtain to effect direct radiant heat transfer thereto, an open water tank at the bottom of said heating chamber for collecting heated water, a flue at the top of said heating chamber for exhausting burned gases from said radiant heating panel after they have risen past said successive water pans pre-heating the water descending therethrough and reducing the temperature of exhaust gases, and a water outlet from said tank for supplying hot water requirements.

2. A water heating system as set forth in claim 1 including means for recirculating water from said outlet to said inlet after passing through heat exchange means.

3. A hot water system as set forth in claim 2 including independent means for directly recirculating water from said water tank to the uppermost pan.

4. A water heating system as set forth in claim 1 including an air tube means in said flue above said water pans for further cooling of exhaust gases.

5. A water heating system as set forth in claim 2 including a separate water outlet for meeting hot water requirements which are not recirculated, and means including a water level device and a fresh water inlet valve responsive thereto for making up water discharged through said last named outlet.

6. A water heating system as set forth in claim 1 including a screen depending from said discharge edge providing water film distribution and separation of water particles.

References Cited by the Examiner

UNITED STATES PATENTS

| | | | |
|---|---|---|---|
| 651,207 | 6/1900 | Schaack | 126—355 |
| 2,017,621 | 10/1935 | Grazier | 126—113 X |
| 2,291,872 | 8/1942 | Brantly | 122—166 |
| 2,594,914 | 4/1952 | Grosskloss | 158—113 X |
| 2,677,368 | 5/1954 | Janecek | 126—350 |
| 2,726,116 | 12/1955 | Barber | 239—18 |
| 3,060,921 | 10/1962 | Luring et al. | 126—350 |
| 3,076,605 | 2/1963 | Holden | 236—15 |
| 3,090,376 | 5/1963 | Chambers | 126—350 |

FOREIGN PATENTS

| | | |
|---|---|---|
| 596,136 | 8/1925 | France. |
| 893,653 | 2/1944 | France. |
| 288,849 | 4/1928 | Great Britain. |

FREDERICK L. MATTESON, Jr., *Primary Examiner.*

JAMES W. WESTHAVER, *Examiner.*